April 9, 1940.  R. A. BOWMAN  2,196,895
HIGH-PRESSURE SEALING HEAD
Filed May 18, 1938
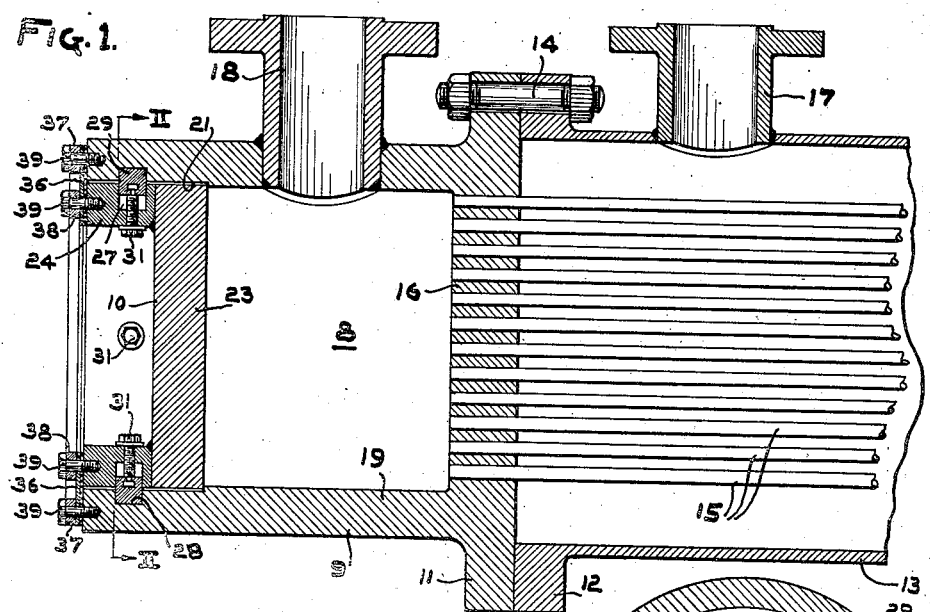
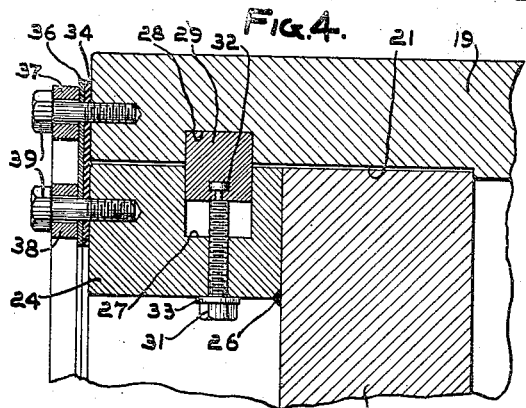
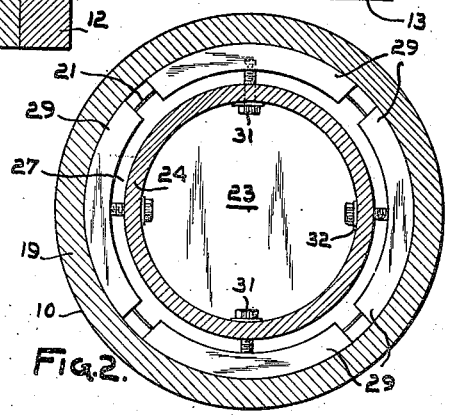
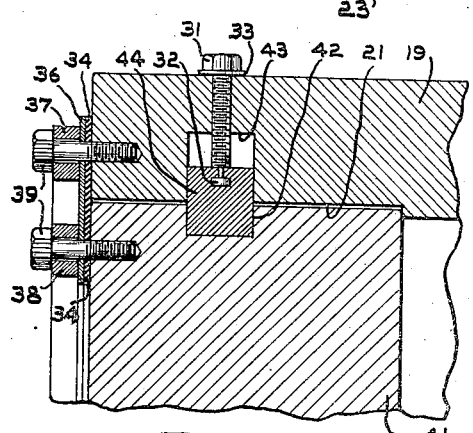
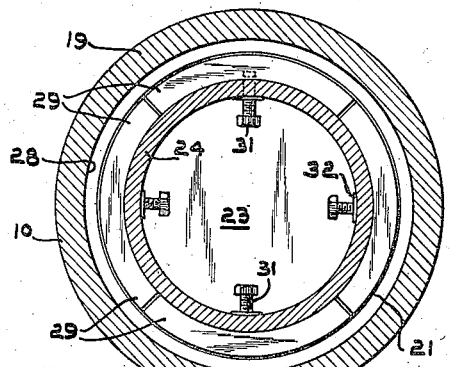
INVENTOR
ROBERT A. BOWMAN.
BY
a. B. Reavis
ATTORNEY Patented Apr. 9, 1940

2,196,895

UNITED STATES PATENT OFFICE 2,196,895

HIGH-PRESSURE SEALING HEAD

Robert A. Bowman, Prospect Park, Pa., assignor to Westinghouse Electric & Manufacturing Company, East Pittsburgh, Pa., a corporation of Pennsylvania Application May 18, 1938, Serial No. 208,550

4 Claims. (Cl. 220—55)

This invention relates to closures for pressure vessels and more particularly to covers and closure members for high-pressure heads for heat exchange apparatus.

An object of the invention is the provision of a closure for high-presure heads wherein the internal pressure load is transmitted to a shear ring.

Another object of the invention is the provision of closure means for high-pressure heads which will take sealing pressure loads in either direction equally well.

Another object of the invention is the provision of a relatively flexible sealing member to take care of any variations in dimensions of parts.

A further object of the invention is the provision of a high-pressure head in which the pressure load is taken by a shear ring inside a sealing device so as to be totally enclosed.

Another object of the invention is the provision of a high-pressure head in which the pressure load is taken by a sectional shear ring, means being provided for moving the shear ring sections radially to operative and to inoperative positions.

These and other objects are effected by my invention as will be apparent from the following description and claims taken in connection with the accompanying drawing, forming a part of this application, in which:

Fig. 1 is a longitudinal sectional view of a portion of the tubular heat exchanger constructed in accordance with the invention;

Fig. 2 is a sectional view along the line II—II of Fig. 1 looking in the direction of the arrows;

Fig. 3 is a view similar to Fig. 2 but showing the shear ring sections moved to inoperative position, for withdrawal of the cover;

Fig. 4 is an enlarged sectional view of a portion of Fig. 1; and

Fig. 5 is a view similar to Fig. 4 illustrating a modification of the invention.

In the drawing, there is shown a high-pressure head at 8 including a body member 9 and a cover 10. The body member has a flange 11 at one end for attachment to the flange 12 of the shell 13 of a tubular heat exchanger, by suitable means, such as bolts 14. Tubes 15 have terminal portions secured in the tube plate wall 16 of the body member and they extend longitudinally through the shell to the outlet end (not shown) of the heat exchanger. As is usual, the shell 13 has an inlet 17; and, where the heat exchanger is of the single-pass type, as herein illustrated, the body member is provided with an inlet 18 in its cylindrical wall 19 for the admission of fluid under high pressure. The cover 10 is detachably connected interiorly of the outer end of the wall 19 by the means hereinafter described.

Preferably, the open outer end of the cylindrical wall 19 is counterbored as at 21 to receive the cover 10, which is comprised by a relatively heavy disk-like member 23 and a heavy annular rim portion 24 attached to the outer face of the cover, preferably by welding, as at 26, whereby a fluid-tight seal is provided between the two parts. The outer peripheral wall of the annular rim 24 is aligned with the peripheral wall of the disk-like portion 23.

The rim portion of the cover is provided with an outwardly-facing annular groove 27, and the cylindrical wall 19 of the body member 9 is provided with a corresponding inwardly-facing annular groove 28, the two grooves complementally forming a closed annular passage. A plurality of shear pieces 29 are disposed in the annular passage, and are movable radially therein, the grooves 27 and 28 being of such radial dimensions that, when the shear pieces are moved inwardly to their extreme position, they are partially in both grooves. In this latter position, they serve to transmit pressure from the head to the wall 19 of the body member.

Means are provided for moving the shear pieces radially to operative and inoperative positions, and comprise a plurality of bolts 31 threaded through the inner peripheral wall of the groove 27, with their inner ends swivelled at 32 to the shear pieces. The heads of the bolts extend into the circular space within the rim of the cover, where they are accessible for moving the shear pieces. Sealing means, such as shown at 33, is provided beneath the heads of the bolts, to prevent leakage therearound.

The relatively narrow annular clearance between the cover and the end of the body member is covered by a straddle type seal comprising an annular gasket member 34 abutting the outer end faces of the cover and the cylindrical wall, and an annular sealing plate 36 overlying the gasket. Preferably, the sealing plate is made of relatively thin flexible metal to accommodate unavoidable variations in dimensions of parts. Relatively heavy outer rings 37 and 38 are connected by bolts 39 to the cover and the cylindrical wall and serve to exert clamping pressure on the sealing plate such that the latter is sealed with respect to the cover and the cylindrical wall by the gasket 34.

In Fig. 5, there is shown a modification which differs from the preceding construction primarily in that the shear pieces are received in a relatively deep groove 43 in the wall of the body member when in inoperative position, and they are moved radially inwardly to operative position in the cover groove 42 and partially in the groove 43 in the body with the bolts extending radially outwardly through the peripheral wall of the recess in the body member. With this arrangement, the cover may be formed of a single relatively heavy disk-like member 41.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. Apparatus of the character described comprising a hollow pressure-sustaining body member having an opening at one end and an inwardly-facing circumferential groove providing a radial thrust shoulder; a cover in the opening overlapping said groove and having an outwardly-facing circumferential groove aligned with the groove in the body member and providing a radial thrust shoulder, said grooves complementally forming a closed annular passage; a plurality of arcuate segmental shear pieces in said passage; means for moving said shear pieces radially comprising a plurality of bolts threadedly mounted in and extending radially through a peripheral wall of the annular passage with their heads exteriorly accessible, said shear pieces, at one extremity of their movement, being disposed entirely within one of the grooves and, at the opposite extremity of their movement, being disposed in both grooves, whereby they may transmit pressure from the thrust shoulder of the cover to the thrust shoulder of the body member; and means sealing the joint between the cover and the body member.

2. Apparatus of the character described comprising a hollow pressure-sustaining body member having an opening at one end and an inwardly-facing circumferential groove; a cover in the opening overlapping said recess and having an outwardly-facing circumferential groove; said grooves being aligned and complementally forming a closed annular passage; a plurality of shear pieces in said passage; means for moving said shear pieces radially; said means comprising a plurality of bolts threaded through a peripheral wall of the annular passage, swivelled to the shear pieces, and having their heads accessible exteriorly of the body member and cover; said shear pieces, at one extremity of their movement, being disposed entirely within one of the grooves and, at the opposite extremity of their movement, being disposed in both grooves, whereby they may transmit pressure from the cover to the body member; means for sealing the joint between the cover and the body member; and sealing means between the bolt heads and the peripheral wall through which the bolts extend.

3. Apparatus of the character described comprising a hollow pressure-sustaining body member having an opening at one end and an inwardly-facing circumferential groove providing a radial thrust shoulder; a cover closely received in the opening and comprised by a disk-like portion having an annular rim portion rigidly secured to the outer face thereof in fluid-tight relation thereto; said rim portion having an outwardly-facing circumferential groove providing a radial thrust shoulder; said grooves being aligned and complementally forming a closed annular passage; a plurality of shear pieces disposed in said passage; means for moving said shear pieces radially and comprising a plurality of bolts swivelled to the shear pieces and extending radially through the peripheral wall of the groove in the rim portion with their heads projecting into the space within said rim portion; the grooves being of such radial depth that, when the shear pieces are moved to their innermost position, they are disposed entirely within the recess of the rim portion whereby the cover and shear pieces may be removed from the opening in the body member, and, when the shear pieces are moved to their outermost position, they are disposed in both recesses whereby they may transmit pressure from the cover to the body member; and means sealing the joint between said cover and said body member.

4. Apparatus of the character described comprising a hollow pressure-sustaining body member having an opening at one end and an inwardly-facing circumferential groove providing a radial thrust shoulder; a cover closely received in said opening with its peripheral face overlying the groove and having an outwardly-facing circumferential groove providing a radial thrust shoulder; said grooves being aligned and complementally forming a closed annular passage; a plurality of shear pieces disposed in said passage; means for moving said shear pieces radially and comprising a plurality of bolts swivelled to the shear pieces and extending radially through the peripheral wall of the recess in the body portion; the grooves being of such radial depths that, when the shear pieces are at their outermost position, they are disposed entirely within the groove of the body portion whereby the cover may be removed from the opening in said body member, and, when the shear pieces are in their innermost position, they are disposed in both grooves whereby they may transmit pressure from the cover to the body member; and means sealing the joint between said cover and said body member.

ROBERT A. BOWMAN.